United States Patent
Salasoo (10) Patent No.: US 10,300,804 B2
(45) Date of Patent: May 28, 2019

(54) APPARATUS AND METHOD FOR AUTOMATED POSITIONING OF A VEHICLE

(71) Applicant: General Electric Company, Schenectady, NY (US)

(72) Inventor: Lembit Salasoo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 14/966,723

(22) Filed: Dec. 11, 2015

(65) Prior Publication Data

US 2016/0318415 A1 Nov. 3, 2016

Related U.S. Application Data

(60) Provisional application No. 62/154,339, filed on Apr. 29, 2015.

(51) Int. Cl.
*B60L 11/18* (2006.01)
*G05D 1/02* (2006.01)

(52) U.S. Cl.
CPC ....... *B60L 11/1833* (2013.01); *B60L 11/1822* (2013.01); *G05D 1/0225* (2013.01); *G05D 1/0234* (2013.01); *G05D 2201/0213* (2013.01)

(58) Field of Classification Search
CPC ............ B60L 11/1833; B60L 11/1822; G05D 1/0225; G05D 1/0234; G05D 2201/0213;
(Continued)

(56) References Cited

U.S. PATENT DOCUMENTS 3,785,514 A    1/1974  Forsyth et al.
3,790,816 A    2/1974  Berman
(Continued)

FOREIGN PATENT DOCUMENTS

CA    2784670 A1    7/2011
CN    102420447 A   4/2012
(Continued)

OTHER PUBLICATIONS

Lembit Salasoo, U.S. Appl. No. 62/154,372, filed Apr. 29, 2015.
(Continued)

*Primary Examiner* — Aaron L Troost
*Assistant Examiner* — Paula L Schneider
(74) *Attorney, Agent, or Firm* — Buckley, Maschoff & Talwalkar LLC (57) ABSTRACT

An apparatus for positioning a vehicle includes an alignment sensor that has a field of view and a vehicle alignment system operatively connected to the alignment sensor and to at least one positioning system of the vehicle. Movement of the vehicle varies an appearance of a fiducial surface within the alignment sensor's field of view. The vehicle alignment system is configured to implement a method that includes monitoring the appearance of the fiducial surface to the alignment sensor, comparing the appearance of the fiducial surface to a pre-determined set of benchmark appearances, and operating the at least one positioning system based on a determination by the vehicle alignment system of whether the appearance of the fiducial surface to the alignment sensor satisfies a pre-determined target appearance that corresponds to a desired location and position of the vehicle relative to a fixed location.

20 Claims, 3 Drawing Sheets

(58) Field of Classification Search
CPC . G05D 1/0242; G05D 1/0246; Y02T 10/7005
USPC .......................................................... 701/23
See application file for complete search history.

(56) References Cited

U.S. PATENT DOCUMENTS

| | | | |
|---|---|---|---|
| 3,847,085 A | 11/1974 | Rypinski | |
| 3,880,299 A | 4/1975 | Zollinger | |
| 4,102,273 A | 7/1978 | Merkle et al. | |
| 4,272,716 A | 6/1981 | Etienne | |
| 4,342,533 A | 8/1982 | Hane | |
| 4,983,903 A | 1/1991 | Bae et al. | |
| 5,091,687 A | 2/1992 | Meyer et al. | |
| 5,163,537 A | 11/1992 | Radev | |
| 5,318,142 A | 6/1994 | Bates et al. | |
| 5,360,307 A | 11/1994 | Schemm et al. | |
| 5,373,195 A | 12/1994 | De Doncker et al. | |
| 5,425,159 A | 6/1995 | Kluttermann et al. | |
| 5,523,666 A | 6/1996 | Hoelzl et al. | |
| 5,545,967 A | 8/1996 | Osborne et al. | |
| 5,594,318 A | 1/1997 | Nor et al. | |
| 5,612,606 A | 3/1997 | Guimarin et al. | |
| 5,620,057 A | 4/1997 | Klemen et al. | |
| 5,659,237 A | 8/1997 | Divan et al. | |
| 5,659,240 A | 8/1997 | King | |
| 5,764,027 A | 6/1998 | Harvey | |
| 5,898,282 A | 4/1999 | Drozdz et al. | |
| 5,982,143 A | 11/1999 | Stuart | |
| 6,150,795 A | 11/2000 | Kutkut et al. | |
| 6,294,843 B1 | 9/2001 | Kato et al. | |
| 6,378,627 B1* | 4/2002 | Tubel ....................... | E21B 4/18 166/250.01 |
| 6,380,701 B1 | 4/2002 | Kahlon et al. | |
| 6,390,215 B1 | 5/2002 | Kodama et al. | |
| 6,841,971 B1 | 1/2005 | Spee et al. | |
| 6,973,880 B2 | 12/2005 | Kumar | |
| 7,004,710 B1 | 2/2006 | Quade | |
| 7,053,588 B2 | 5/2006 | Nakanishi et al. | |
| 7,061,131 B2 | 6/2006 | King et al. | |
| 7,448,328 B2 | 11/2008 | Kumar | |
| 7,602,143 B2 | 10/2009 | Capizzo | |
| 7,715,958 B2 | 5/2010 | Kumar | |
| 7,755,322 B2 | 7/2010 | Raff et al. | |
| 7,854,203 B2 | 12/2010 | Kumar | |
| 7,893,658 B2 | 2/2011 | Bhardwaj | |
| 8,001,242 B2 | 8/2011 | Mild et al. | |
| 8,022,666 B2 | 9/2011 | Li | |
| 8,025,474 B2 | 9/2011 | Springston et al. | |
| 8,047,317 B2 | 11/2011 | Mari Curbelo et al. | |
| 8,063,609 B2 | 11/2011 | Salasoo et al. | |
| 8,089,249 B2 | 1/2012 | Zhang et al. | |
| 8,148,952 B2 | 4/2012 | Schaffnit | |
| 8,253,378 B2 | 8/2012 | Lee et al. | |
| 8,487,582 B2 | 7/2013 | King et al. | |
| 8,643,334 B2 | 2/2014 | Kuo et al. | |
| 8,829,853 B2 | 9/2014 | Hill et al. | |
| 8,890,475 B1 | 11/2014 | Becker | |
| 8,952,662 B2 | 2/2015 | Ma | |
| 9,035,607 B2 | 5/2015 | Lafrance | |
| 9,037,334 B1 | 5/2015 | Cole | |
| 9,142,979 B2 | 9/2015 | Tsai | |
| 9,174,525 B2 | 11/2015 | Caron | |
| 9,225,191 B2 | 12/2015 | Drobnik | |
| 9,290,100 B2 | 3/2016 | Wisniewski et al. | |
| 2002/0085903 A1 | 7/2002 | Gagnon et al. | |
| 2002/0145404 A1 | 10/2002 | Dasgupta et al. | |
| 2004/0112320 A1 | 6/2004 | Bolz et al. | |
| 2005/0053451 A1 | 3/2005 | Gagnon et al. | |
| 2005/0077875 A1 | 4/2005 | Bohley | |
| 2005/0077879 A1 | 4/2005 | Near | |
| 2006/0250902 A1 | 11/2006 | Bender et al. | |
| 2007/0051542 A1 | 3/2007 | Wilks | |
| 2007/0178771 A1 | 8/2007 | Goetz et al. | |
| 2008/0233469 A1 | 9/2008 | Drozdz et al. | |
| 2009/0058355 A1 | 3/2009 | Meyer | |
| 2010/0080030 A1 | 4/2010 | Wiegman et al. | |
| 2010/0145717 A1 | 6/2010 | Hoeltzel | |
| 2010/0235030 A1 | 9/2010 | Xue et al. | |
| 2011/0044791 A1 | 2/2011 | Agassi et al. | |
| 2011/0074351 A1 | 3/2011 | Bianco et al. | |
| 2011/0089898 A1 | 4/2011 | Lee et al. | |
| 2011/0099747 A1* | 5/2011 | Kim ............................ | A47L 5/22 15/347 |
| 2011/0114398 A1 | 5/2011 | Bianco | |
| 2011/0123309 A1 | 5/2011 | Berdelle-Hilge et al. | |
| 2011/0193528 A1 | 8/2011 | Huggins | |
| 2011/0251935 A1 | 10/2011 | German et al. | |
| 2011/0285352 A1 | 11/2011 | Lim et al. | |
| 2011/0301794 A1 | 12/2011 | Bastien | |
| 2012/0025784 A1 | 2/2012 | Rana | |
| 2012/0032638 A1 | 2/2012 | Jung | |
| 2012/0038216 A1 | 2/2012 | Berry et al. | |
| 2012/0068664 A1 | 3/2012 | Franzen et al. | |
| 2012/0119709 A1 | 5/2012 | Mull et al. | |
| 2012/0217806 A1 | 8/2012 | Heidenreich et al. | |
| 2012/0262110 A1 | 10/2012 | Soong et al. | |
| 2012/0271723 A1 | 10/2012 | Penilla et al. | |
| 2012/0286733 A1 | 11/2012 | Chang et al. | |
| 2012/0316671 A1 | 12/2012 | Hammerslag et al. | |
| 2013/0015817 A1 | 1/2013 | Wang et al. | |
| 2013/0049698 A1 | 2/2013 | Jung | |
| 2013/0057219 A1 | 3/2013 | Sakata | |
| 2013/0063072 A1 | 3/2013 | Shirasaka et al. | |
| 2013/0138279 A1 | 5/2013 | Shi et al. | |
| 2013/0177795 A1 | 7/2013 | Power et al. | |
| 2013/0214733 A1 | 8/2013 | Liang et al. | |
| 2013/0226344 A1* | 8/2013 | Wong ..................... | G05D 1/024 700/258 |
| 2013/0257145 A1 | 10/2013 | Caldeira et al. | |
| 2013/0282472 A1 | 10/2013 | Penilla et al. | |
| 2013/0323006 A1 | 12/2013 | Smithson | |
| 2014/0246257 A1 | 9/2014 | Jacobsen et al. | |
| 2014/0266050 A1 | 9/2014 | Biskup | |
| 2015/0033537 A1 | 2/2015 | Poillot et al. | |
| 2015/0137758 A1 | 5/2015 | Taga et al. | |
| 2015/0266382 A1 | 9/2015 | Penmetsa et al. | |
| 2016/0091899 A1* | 3/2016 | Aldred ................. | G05D 1/0225 701/23 |
| 2016/0190858 A1 | 6/2016 | Zhang et al. | |
| 2017/0129603 A1 | 5/2017 | Raptopoulos et al. | |

FOREIGN PATENT DOCUMENTS

| | | |
|---|---|---|
| CN | 102468674 A | 5/2012 |
| CN | 102664433 A | 9/2012 |
| CN | 102882242 A | 1/2013 |
| JP | 04334906 A | 11/1992 |
| JP | 2013247854 A | 12/2013 |
| WO | 2010076767 A1 | 7/2010 |
| WO | 2012154990 A2 | 11/2012 |

OTHER PUBLICATIONS

Lembit Salasoo, U.S. Appl. No. 14/959,424, filed Dec. 4, 2015.
Robert Dean King et al., U.S. Appl. No. 14/971,415, filed Dec. 16, 2015.
Zhi Zhou et al., U.S. Appl. No. 14/967,967, filed Dec. 14, 2015.
Ligong Wang et al., U.S. Appl. No. 14/157,700, filed Jan. 17, 2014.
Robert Dean King, U.S. Appl. No. 14/699,173, filed Apr. 29, 2015.
Saijun Mao et al., U.S. Appl. No. 14/321,935, filed Jul. 2, 2014.
Robert Dean King et al., U.S. Appl. No. 14/541,529, filed Nov. 14, 2014.
Yarlagadda et al., "A Battery Management System Using an Active Charge Equalization Technique Based on DC-DC Converter Topology", Thesis, Master of Science in Engineering, University of Akron, pp. 1-143, Aug. 2011.
Einhorn et al., "Charge Balancing of Serially Connected Lithium-Ion Battery Cells in Electric Vehicles", E & i Electrical Engineering and Information Technology, pp. 167-173, vol. No. 129, Issue No. 3, May 2012.
U.S. Non-Final Office Action issued in connection with Related U.S. Appl. No. 14/157,700 dated Jul. 24, 2015.

(56) References Cited

OTHER PUBLICATIONS

U.S. Non-Final Office Action issued in connection with Related U.S. Appl. No. 14/321,935 dated Feb. 26, 2016.
Chinese Office Action issued in connection with Related CN Application No. 201310331899.0 dated Mar. 2, 2016.
European Search Report and Opinion issued in connection with Related EP Application No. 15194773.6 dated Jul. 7, 2016.
U.S. Non-Final Office Action issued in connection with Related U.S. Appl. No. 14/541,529 dated Jul. 15, 2016.
U.S. Notice of Allowance Office Action issued in connection with Related U.S. Appl. No. 14/321,935 dated Jul. 20, 2016.
U.S. Final Office Action issued in connection with Related U.S. Appl. No. 14/157,700 dated Aug. 4, 2016.
U.S. Notice of Allowance Office Action issued in connection with Related U.S. Appl. No. 14/971,415 dated Oct. 5, 2016.
U.S. Non-Final Office Action issued in connection with Related U.S. Appl. No. 14/699,173 dated Nov. 22, 2016.
U.S. Non-Final Office Action issued in connection with Related U.S. Appl. No. 14/967,967 dated Nov. 25, 2016.
U.S. Non-Final Office Action issued in connection with Related U.S. Appl. No. 14/541,529 dated Jan. 12, 2017.
U.S. Final Office Action issued in connection with Related U.S. Appl. No. 14/541,529 dated Jul. 3, 2017.
U.S. Non-Final Office Action issued in connection with Related U.S. Appl. No. 14/959,424 dated Sep. 1, 2017.

* cited by examiner

APPARATUS AND METHOD FOR AUTOMATED POSITIONING OF A VEHICLE

CROSS-REFERENCE TO RELATED APPLICATIONS

This application claims priority to U.S. Provisional Application No. 62/154,339 filed 29 Apr. 2015.

BACKGROUND

Technical Field

Embodiments of the invention relate generally to apparatus and methods for automated positioning of vehicles with reference to refueling stations. Particular embodiments relate to apparatus and methods for automatically aligning an electric vehicle (EV) with reference to a battery exchange apparatus.

Discussion of Art

Generally, vehicles that are not continuously powered from an external source incorporate some type of energy storage apparatus, e.g., a battery or fuel tank, which requires periodic recharging or replenishment. In context of work vehicles (e.g., a mine vehicle, a rail locomotive, or other off-highway vehicle/OHV), however, it is generally desirable to reduce or substantially eliminate the downtime required for recharging or replenishing a battery or fuel tank. For example, it may be desirable for a battery-powered electric vehicle to be provided with a battery exchange apparatus for removing an expended battery and replacing a fully charged battery. For such an apparatus it may be necessary for an electric vehicle to be positioned at a battery exchange position to enable removal and replacement of batteries.

It is anticipated that when a vehicle is moving to a battery exchange position relative to a stationary battery exchange apparatus in preparation to transfer a battery from onboard the vehicle to the battery exchange apparatus, it will be difficult for an operator (whether an on-board human operator, a remotely-controlling human operator, or an automated vehicle system) to ensure that the vehicle moves to a correct position and orientation. Some efforts have been made to relax mechanical tolerances for position and orientation in, for example, co-pending and commonly assigned U.S. patent application Ser. No. 14/959,424, filed Dec. 4, 2015, which is incorporated by reference in its entirety herein. It remains desirable, however, to provide apparatus and methods for automated positioning a vehicle into a battery exchange position or, more generally, into a position for energy storage apparatus replenishment.

BRIEF DESCRIPTION

Aspects of the invention provide apparatus and methods for positioning an electric vehicle or other vehicle adjacent a battery exchange apparatus or other location, despite imperfect initial position and alignment of the vehicle.

In an embodiment, a system or apparatus for positioning a vehicle includes an alignment sensor (that has a field of view) and a vehicle alignment system. The vehicle alignment system is configured to control vehicle positioning, and includes at least one controller that is operatively connected to the alignment sensor and to at least one positioning system of the vehicle. Movement of the vehicle varies an appearance of a fiducial surface within the field of view of the alignment sensor; the fiducial surface, for example, is positioned at a fixed location off board the vehicle. To control vehicle positioning, the at least one controller is configured to monitor the appearance of the fiducial surface to the alignment sensor, compare the appearance of the fiducial surface to a pre-determined set of benchmark appearances, and operate the at least one positioning system based on a determination of whether the appearance of the fiducial surface to the alignment sensor satisfies a pre-determined target appearance that corresponds to a designated location and position of the vehicle relative to the fixed location.

In an embodiment, a system or apparatus for positioning a vehicle includes an alignment sensor (which has a field of view), a distance sensor, and a vehicle alignment system that includes at least one controller operatively connected to receive visual data from the alignment sensor, distance data from the distance sensor, and to operate at least one positioning system of the vehicle. The apparatus further includes a fiducial surface configured to be positioned at a fixed location off-board the vehicle. During operation, movement of the vehicle varies an appearance of the fiducial surface within the field of view of the alignment sensor. The at least one controller is configured to initiate control of vehicle positioning responsive to the distance data from the distance sensor indicating that the vehicle has approached within a first threshold distance from the fixed location. To control vehicle positioning, the at least one controller is configured to receive the visual data that includes the appearance of the fiducial surface to the alignment sensor, compare the appearance of the fiducial surface to a pre-determined set of benchmark appearances, determine whether the appearance of the fiducial surface satisfies, approaches, or diverges from a pre-determined target appearance that corresponds to a designated location and position of the vehicle relative to the fixed location, and operate the at least one positioning system until either the appearance of the fiducial surface satisfies the pre-determined target appearance or the appearance of the fiducial surface cannot be made to approach the pre-determined target appearance.

Other embodiments relate to a method for positioning a vehicle. The method includes generating sensor data of a fiducial surface using an alignment sensor that has a field of view, wherein an appearance of the fiducial surface within the alignment sensor's field of view depends on a position of the vehicle relative to a fixed location, and operating at least one positioning system of the vehicle, under control of a vehicle alignment system that may be operatively connected to receive the sensor data from the alignment sensor. The vehicle alignment system is configured to recognize the appearance of the fiducial surface to the alignment sensor, to compare the appearance of the fiducial surface to a pre-determined set of benchmark appearances, and to operate the at least one positioning system, based on a determination by the vehicle alignment system of whether the appearance of the fiducial surface to the alignment sensor satisfies, approaches, or diverges from a pre-determined target appearance that corresponds to a desired location and position of the vehicle relative to the fixed location.

DRAWINGS

The present invention will be better understood from reading the following description of non-limiting embodiments, with reference to the attached drawings, wherein below.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to electric vehicles, embodiments of the invention also are applicable for use vehicles generally. As used herein, "vehicle" is a machine used for transporting people or goods both on land, such as a car, truck, cart, off-highway vehicle/OHV, mining vehicle, etc., and in other media. These include, but are not limited, to vehicles powered by combustion engines, electric motors, or hybrid configurations. Embodiments of the invention may be particularly suitable for vehicles that may be remotely controlled, or that otherwise include automated or self-guiding functionality.

Embodiments of the invention are intended to alleviate or reduce the downtime required for recharging or topping up an energy storage apparatus onboard a vehicle, e.g., by enabling automated removal and replacement of expended and fully charged energy storage apparatus, respectively.

As used herein, the terms "substantially," "generally," and "about" indicate conditions within reasonably achievable manufacturing and assembly tolerances, relative to ideal desired conditions suitable for achieving the functional purpose of a component or assembly.

Figure 1:
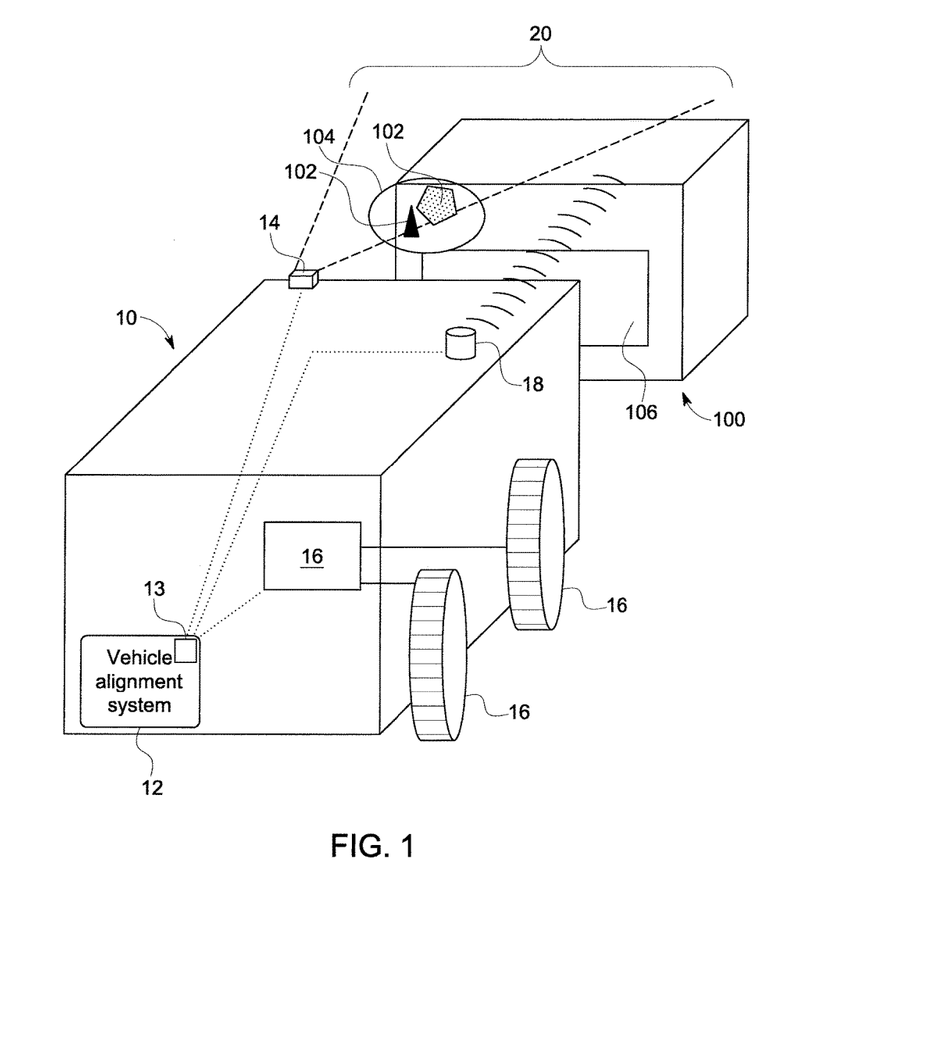
FIG. 1 is a schematic view of an embodiment of an apparatus or system for positioning a vehicle.

FIG. 1 is a schematic view of a system or apparatus 8 for positioning a vehicle 10. The apparatus 8 includes a vehicle alignment system 12 for use in conjunction with a fiducially-marked location 100. For example, the location may be a fixed location of a battery exchange apparatus. The vehicle alignment system 12 may be disposed at least partially on-board the vehicle, and includes one or more controllers 13 (e.g., processors, microcontrollers, vehicle control computers, etc.) that are operatively connected (e.g., connected electrically, optically, by wireless electromagnetic or audio signaling, suitable to send and receive data and command signals) to an alignment sensor 14 affixed on the vehicle and to at least one positioning system 16 of the vehicle 10. In embodiments, the system or apparatus 8 may also include a distance sensor 18 (affixed to the vehicle) that is operatively connected to the vehicle alignment system 12. The positioning system 16 of the vehicle includes propulsion and/or steering or other systems of the vehicle for moving and orienting the vehicle. In embodiments, the one or more controllers 13 are operatively connected to the positioning system 16 of the vehicle to automatically control movement (e.g., propulsion and steering) of the vehicle.

The alignment sensor 14 has a field of view 20. For example, the alignment sensor can include a camera with a lens and sensor for converting light received by the lens into electrical signals. As the vehicle 10 approaches the battery exchange apparatus or other location 100, a fiducial surface 104 affixed to the battery exchange apparatus or other location 100 comes within the field of view 20 of the alignment sensor, allowing the alignment sensor to capture the appearance of the fiducial surface 104. (Generally, the field of view will be wide enough for the fiducial surface 104 to come within its ambit as long as the vehicle is at least grossly aligned with the location.) For providing designated and distinct appearance features, the fiducial surface 104 is outfitted with a set of fiduciary markers 102. In the case of a battery exchange apparatus, the fiducial surface 104 may include a battery receiver opening 106, into which a battery (not shown) can be transferred from the properly-positioned vehicle 10.

Figure 2:
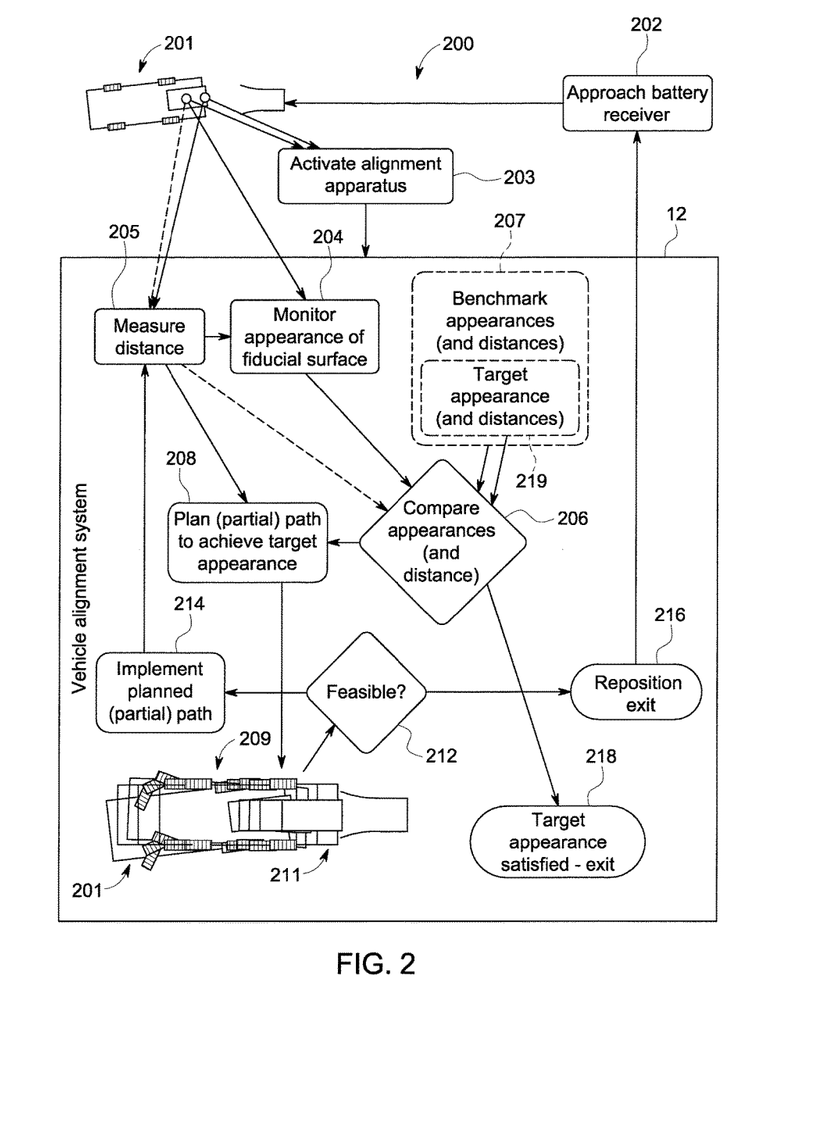
FIG. 2 shows schematically a vehicle alignment or positioning method that is implemented by the apparatus of FIG. 1, according to an embodiment of the invention.

In order to properly position the vehicle 10 relative to the location 100, e.g., with its battery proximate the battery receiver opening 106 for transfer thereto, the one or more controllers 13 of the vehicle alignment system 12 are configured to implement a vehicle alignment method 200 as shown in FIG. 2. In order to support the vehicle alignment method 200, the fiducial surface 104 includes at least two (or more) of the markers 102. Each marker 102 is at a different location on the fiducial surface 104, but the markers 102 may overlap. Additionally, the fiducial surface 104 may incorporate multiple planes or layers that are disposed in parallel or at angles to each other, with one or more of the markers 102 disposed on a different layer than the others of the markers 102. (Thus, although the fiducial surface 104 may be a single planar surface, it is not necessarily such in all embodiments.) At least some of the markers 102 differ from each other in at least one of shape, size, orientation, or color; in certain embodiments, each of the at least two markers differs from the other markers in at least one of shape, size, orientation, or color. For example, FIG. 1 shows one triangular marker 102 that has a dark fill pattern, alongside another, pentagonal marker 102 that has a stippled light fill pattern.

FIG. 2 shows schematically the vehicle alignment method 200 that is implemented by the vehicle alignment system 12 according to an embodiment of the invention. As a first step, the vehicle 10 approaches 202 the battery exchange apparatus or other location 100 under manual control, or under "coarse" automation (e.g., conventional work-routing automation), to an initial position 201 that is close to the battery exchange apparatus 100. Attainment of this initial position is detected by the distance sensor 18 measuring the distance between the vehicle 10 and the battery exchange apparatus 100, or by the alignment sensor 14 field of view 20 covering all of the markers 102, or by judgment by an operator of the vehicle. The vehicle alignment system 12 then is activated 203. (The distance sensor, if included, may be a laser distance or proximity sensor, an infrared distance or proximity sensor, an ultrasonic distance or proximity sensor, or the like, which is configured, for example, to determine a distance from the vehicle to the location by emitting a signal and measuring a time for the signal to return to the sensor after reflecting off the location.)

Next, the vehicle alignment system 12 begins to monitor 204 the appearance of the fiducial surface 104 by way of the alignment sensor 14. By monitoring the appearance of the fiducial surface 104, the vehicle alignment system 12 can compute alignment of the vehicle 10 to the fiduciary markers 102 on the battery exchange apparatus or other location. Also, the vehicle alignment system 12 may measure 205 the distance from the vehicle 10 to the battery exchange apparatus 100 based on the appearance of the fiducial surface 104, as shown by the dashed line in FIG. 2. Alternatively, the vehicle alignment system 12 may measure distance by means of the distance sensor 18.

The alignment sensor 14 may detect the markers 102 using, for example, optical, infrared, radar, or ultrasound, detecting beacons disposed on or attached to the location 100, or may detect response of the markers 102 to light, infrared, radar or ultrasound emitted by the vehicle 10. Optionally, the alignment sensor 14 may present light, infrared, radar, or ultrasound images to a vehicle operator, who identifies the fiduciary markers 102 within the image, which the vehicle alignment system 12 then continues to track.

The vehicle alignment system 12 may compute alignment by a) comparing 206 an appearance of the fiducial surface 104 to one or more benchmark appearances 207 in a pre-determined set of benchmark appearances, and/or b) by computing positions of the markers 102 relative to the vehicle using triangulation of distances obtained by the distance sensor 14, then comparing 206 those relative positions to benchmark distances 207. The benchmark appearances may be stored in a memory unit accessible by the one or more controllers. In embodiments, with reference to FIG. 3, the benchmark appearances 108 in the set 110 are different appearances/views 112a, 112b, 112c, 112d, etc. of the fiducial surface taken at different known distances and/or orientations of a vehicle relative to the fiducial surface, using a given vehicle configuration and alignment sensor placement on the vehicle configuration. The benchmark appearances are generated when initially setting up the fiducial surface at the location, using the vehicle and sensor placement with known configuration (i.e., a test or setup vehicle), and stored in memory. Later, when positioning that same type/configuration of vehicle/sensor during normal work operations, at an unknown orientation/distance, the appearance of the fiducial surface captured by the sensor can be compared to the various benchmark appearances for determining vehicle orientation/distance.

Figure 3:
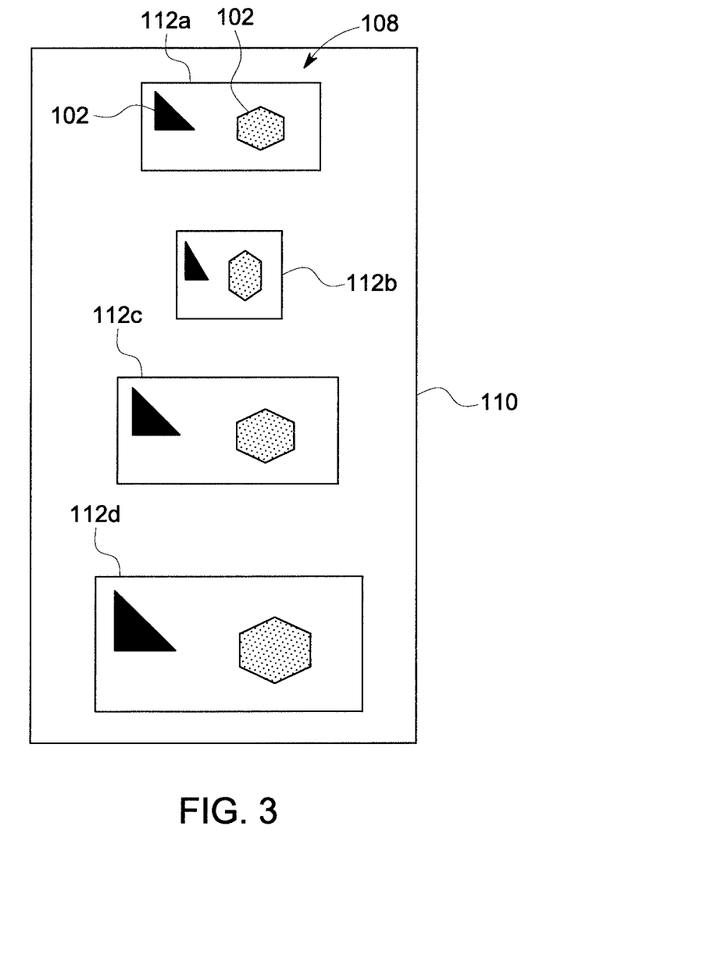
FIG. 3 shows a set of benchmark appearances, according to an embodiment.

For example, during setup a first benchmark appearance/view 112a of the fiducial surface may be captured when the vehicle is directly aligned with the location at a first distance d1; a second benchmark appearance/view 112c of the fiducial surface may be captured when the vehicle is directly aligned with the location at a second, closer distance d2 (where d2 is less than d1); a third benchmark appearance/view 112d of the fiducial surface may be captured when the vehicle is directly aligned with the location at a third, closer distance d3 (where d3 is less than d2); a fourth benchmark appearance/view 112b of the fiducial surface may be captured when the vehicle is at the first distance but misaligned with the location; and so on. During normal operations of a vehicle (with the same configuration as the setup/test vehicle) at an unknown distance/orientation, if a given captured appearance of the fiducial surface matches one of the benchmark appearances 112a-112d, then the vehicle distance/orientation is known based on the match. As should be appreciated, the distance and/or orientation information may be stored in memory in association with the benchmark appearances. Alternatively or additionally, the system may be provided with information or otherwise configured to know how a change in captured appearances matches to a desired progression for reaching a designated end position of the vehicle. For example, without knowing actual distances, the system may be provided with information (and/or configured to assess, such as by identifying features in video data and tracking movement of those features over successive image frames) that a progression of captured appearances successively matching benchmark appearance 112a, then benchmark appearance 112c, and then benchmark appearance 112d means the vehicle is approaching the location at a designated (desired) orientation, whereas if a captured appearance matches an "angled" benchmark appearance 112b, this means the vehicle is not oriented correctly.

Based on the computation of alignment, the vehicle alignment system 12 then implements a path planning algorithm 208, which may plan a complete or a partial path 209 to a designated battery exchange position or other designated position 211 of the vehicle from the present position 201 of the vehicle 10 relative the battery exchange apparatus or other location 100. The vehicle alignment system 12 then assesses 212 feasibility of maneuvering the vehicle 10 to the battery exchange position 211 relative to the battery exchange apparatus. The feasibility results are one of:

"Feasible," in which case the vehicle alignment system 12 implements 214 the planned path 209 by either (a) controlling the positioning system(s) 16 in order to continue movement of the vehicle 10 towards the battery exchange apparatus 100 along the planned path 209 or (b) communicating to a vehicle operator the desired manipulations of the positioning system(s) 16, and monitors performance; or "Infeasible," in which case the vehicle alignment system 12 exits operation and repositions 216 the vehicle 10 by either (a) operating the positioning system(s) 16 the vehicle to reverse direction away from the battery exchange apparatus 100 to a more favorable initial position 201 or (b) communicating to a vehicle operator the desired manipulations of the positioning system(s) 16, and monitoring performance or (c) indicating to a vehicle operator that alignment is infeasible and return control to the operator to make another approach to an initial position and (d) optionally showing to a vehicle operator the initial position or positioning or docking issue that need correction.

In embodiments, the vehicle alignment system 12 implements the method 200 in a "closed loop" mode, meaning throughout implementation 214 of the planned path 209, the vehicle alignment system 12 measures 205 distance from the vehicle to the battery exchange apparatus 100 and also monitors 204 the appearance of the fiducial markers 102 within the alignment sensor field of view 20. In other embodiments, the vehicle alignment system 12 may implement the method 200 in an "open loop" mode, meaning during implementation 214 of the planned path 209, the vehicle alignment system neither measures distance nor monitors appearance, but checks distance and alignment at the end of the planned path 209. In some embodiments the vehicle alignment system 12 may implement the method 200 in a stepped open loop mode, meaning implementing 214 a partial path 209 then exiting implementation to re-check distance and alignment of the vehicle 10 relative to the battery exchange apparatus or other location 100.

In any embodiment, when the appearance of the fiduciary surface 104 to the alignment sensor 14 "satisfies" 218 a target appearance 219 (e.g., the vehicle distance and alignment relative to the battery exchange apparatus are within predetermined margins from the battery exchange position 211), then the vehicle alignment system 12 detects completion of the automatic alignment method 200 and exits. Generally, it is helpful to bring the vehicle 10 to a standing position at exit from the automatic alignment method 200.

Optionally, the vehicle alignment system 12 is configured to detect failure of the automatic alignment after a predetermined operating time or number of attempts from re-planned initial positions.

In an embodiment, a system or apparatus for positioning a vehicle includes an alignment sensor having a field of view and a vehicle alignment system that includes at least one controller operatively connected to the alignment sensor and to at least one positioning system of the vehicle (e.g., propulsion and/or steering or other navigation). The at least one controller is configured to control vehicle positioning, e.g., by issuing commands to the vehicle positioning system. During operation, movement of the vehicle varies an appearance of a fiducial surface within the field of view of the alignment sensor. The fiducial surface is positioned at a fixed location off board the vehicle, e.g., it may be positioned on or by a battery exchange station in a mine or other location. To control vehicle positioning, the at least one controller is configured to monitor the appearance of the fiducial surface to the alignment sensor, compare the appearance of the fiducial surface to a pre-determined set of benchmark appearances, and operate the vehicle positioning system based on a determination of whether the appearance of the fiducial surface to the alignment sensor satisfies a pre-determined target appearance that corresponds to a designated location and position of the vehicle relative to the fixed location.

In embodiments, the at least one controller is configured to control the vehicle positioning in an open loop mode. In other embodiments, the at least one controller is configured to control the vehicle positioning in a stepped open loop mode.

In an embodiment, the apparatus or system further includes a distance sensor operatively connected to the at least one controller. The at least one controller is configured to implement control of the vehicle positioning responsive to a sensor output of the distance sensor relating to a distance between the vehicle and the fiducial surface, e.g., the at least one controller may implement control of the vehicle positioning responsive to a current distance of the vehicle being within a designated threshold distance of a designated location. In other embodiments, the at least one controller is configured to implement control of the vehicle positioning responsive to a sensor output of the alignment sensor.

In an embodiment, a system or apparatus for positioning a vehicle includes an alignment sensor with a field of view, a distance sensor, a vehicle alignment system, and a fiducial surface. The vehicle alignment system includes at least one controller operatively connected to receive visual data from the alignment sensor, distance data from the distance sensor, and to operate at least one positioning system of the vehicle. The fiducial surface is configured to be positioned at a fixed location off-board the vehicle (e.g., on a battery exchange apparatus at a wayside station), wherein movement of the vehicle varies an appearance of the fiducial surface within the field of view of the alignment sensor. The at least one controller is configured to initiate control of vehicle positioning responsive to the distance data from the distance sensor indicating that the vehicle has approached within a first threshold distance from the fixed location. To control vehicle positioning, the at least one controller is configured to receive the visual data that includes the appearance of the fiducial surface (as it appears to the alignment sensor), compare the appearance of the fiducial surface to a pre-determined set of benchmark appearances, determine whether the appearance of the fiducial surface satisfies, approaches, or diverges from a pre-determined target appearance that corresponds to a designated location and position of the vehicle relative to the fixed location, and operate the at least one positioning system until either the appearance of the fiducial surface satisfies the pre-determined target appearance or the appearance of the fiducial surface cannot be made to approach the pre-determined target appearance.

In embodiments of any of the aforementioned apparatuses or systems, each benchmark appearance in the set of benchmark appearances includes at least two markers disposed at different positions within the benchmark appearance. In embodiments, at least some of the at least two markers differ from each other in at least one of shape, size, orientation, or color. In other embodiments, each of the at least two markers differs from the other markers in at least one of shape, size, orientation, or color. Further, the target appearance may show at least some of the at least two markers oriented broadside to (orthogonal to) the alignment sensor. Further, alternatively or additionally, the target appearance may show the at least two markers at relative positions that are unique among the benchmarked appearances. Further, alternatively or additionally, at least one of the orientations or the shapes of the at least two markers may vary among at least some of the benchmarked appearances.

In an embodiment, a method for positioning a vehicle includes generating sensor data of a fiducial surface using an alignment sensor that has a field of view, wherein an appearance of the fiducial surface within the field of view of the alignment sensor depends on a position of the vehicle relative to a fixed location. The method further includes operating at least one positioning system of the vehicle, under control of a vehicle alignment system that is operatively connected to receive the sensor data from the alignment sensor. (The vehicle alignment system may include one or more controllers configured to control vehicle positioning.) The vehicle alignment system is configured to receive information of the appearance of the fiducial surface to the alignment sensor, to compare the appearance of the fiducial surface to a pre-determined set of benchmark appearances, and to operate the at least one positioning system based on a determination by the vehicle alignment system of whether the appearance of the fiducial surface to the alignment sensor satisfies, approaches, or diverges from a pre-determined target appearance that corresponds to a desired location and position of the vehicle relative to the fixed location.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described methods and apparatuses, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An apparatus for positioning a vehicle, comprising:
an alignment sensor that has a field of view; and
a vehicle alignment system including at least one controller operatively connected to the alignment sensor and to at least one positioning system of the vehicle, the at least one controller configured to control vehicle positioning;
wherein movement of the vehicle varies an appearance of a fiducial surface within the field of view of the alignment sensor, the fiducial surface positioned at a fixed location off board the vehicle;
wherein to control vehicle positioning the at least one controller is configured to monitor the appearance of the fiducial surface to the alignment sensor, compare the appearance of the fiducial surface to a pre-determined set of benchmark appearances of the same fiducial surface to determine if the appearance of the fiducial surface matches one of the benchmark appearances of the fiducial surface, and operate the at least one positioning system based on a determination of whether the appearance of the fiducial surface to the alignment sensor satisfies a pre-determined target appearance that corresponds to a designated location and position of the vehicle relative to the fixed location; and
wherein the controller is configured to monitor the appearance of the fiducial surface to the alignment sensor at an unknown distance or orientation from the fiducial surface, and if the appearance of the fiducial surface matches one of the benchmark appearances of the fiducial surface, to store known distance or orientation information associated with the benchmark appearance in memory based on the match.

2. The apparatus of claim 1, wherein each benchmark appearance in the set of benchmark appearances includes at least two markers disposed at different positions within the benchmark appearance.

3. The apparatus of claim 2, wherein at least some of the at least two markers differ from each other in at least one of shape, size or color.

4. The apparatus of claim 2, wherein each of the at least two markers differs from the other markers in at least one of shape, size, orientation, or color.

5. The apparatus of claim 2, wherein the target appearance shows the at least two markers at relative positions that are unique among the benchmarked appearances.

6. The apparatus of claim 2, wherein at least one of the orientations or the shapes of the at least two markers vary among at least some of the benchmarked appearances.

7. The apparatus of claim 1, wherein the at least one controller is configured to control the vehicle positioning in an open loop mode.

8. The apparatus of claim 1, wherein the at least one controller is configured to control the vehicle positioning in a stepped open loop mode.

9. The apparatus of claim 1, further comprising a distance sensor operatively connected to the at least one controller, wherein the at least one controller is configured to implement control of the vehicle positioning responsive to a sensor output of the distance sensor relating to a distance between the vehicle and the fiducial surface.

10. The apparatus of claim 1, wherein the at least one controller is configured to implement control of the vehicle positioning responsive to a sensor output of the alignment sensor.

11. The apparatus of claim 1, wherein:
the fiducial surface includes a plurality of markers;
wherein the fiducial surface includes multiple planes or layers disposed in parallel or at angles to each other; and
wherein at least one of the plurality of markers is disposed on a different plane or layer than another of the plurality of markers.

12. An apparatus for positioning a vehicle, comprising:
an alignment sensor that has a field of view;
a distance sensor;
a vehicle alignment system including at least one controller operatively connected to receive visual data from the alignment sensor, distance data from the distance sensor, and to operate at least one positioning system of the vehicle; and
a fiducial surface configured to be positioned at a fixed location off-board the vehicle, the fiducial surface including a battery receiver opening into which a battery can be transferred from the vehicle;
wherein movement of the vehicle varies an appearance of the fiducial surface within the field of view of the alignment sensor;
wherein the at least one controller is configured to initiate control of vehicle positioning responsive to the distance data from the distance sensor indicating that the vehicle has approached within a first threshold distance from the fixed location;
wherein to control vehicle positioning the at least one controller is configured to receive the visual data that includes the appearance of the fiducial surface to the alignment sensor, compare the appearance of the fiducial surface to a pre-determined set of benchmark appearances of the same fiducial surface stored in memory, determine whether the appearance of the fiducial surface matches, approaches, or diverges from a pre-determined target appearance of the same fiducial surface stored in memory that corresponds to a designated location and position of the vehicle relative to the fixed location, and operate the at least one positioning system until either the appearance of the fiducial surface matches the pre-determined target appearance or the appearance of the fiducial surface cannot be made to approach the pre-determined target appearance; and wherein the benchmark appearances are different views of the same fiducial surface taken at different known distances and orientations of the vehicle relative to the fiducial surface and stored in memory.

13. The apparatus of claim 12, wherein each benchmark appearance of the set of benchmark appearances includes at least two markers disposed at different positions within the benchmark appearance.

14. The apparatus of claim 13, wherein at least some of the at least two markers differ from each other in at least one of shape, size or color.

15. The apparatus of claim 13, wherein each of the at least two markers differs from the other markers in at least one of shape, size, orientation, or color.

16. The apparatus of claim 13, wherein the target appearance shows the at least two markers at relative positions that are unique among the benchmarked appearances.

17. The apparatus of claim 13, wherein at least one of the orientations or the shapes of the at least two markers vary among at least some of the benchmarked appearances.

18. The apparatus of claim 12, wherein at least the fiducial surface is on a battery exchange apparatus apart from the vehicle.

19. The apparatus of claim 12, wherein:
the fiducial surface includes a plurality of markers;
wherein the fiducial surface includes multiple planes or layers disposed in parallel or at angles to each other; and
wherein at least one of the plurality of markers is disposed on a different plane or layer than another of the plurality of markers.

20. A method for positioning a vehicle, comprising:
generating sensor data of a fiducial surface using an alignment sensor that has a field of view, wherein an appearance of the fiducial surface within the field of view of the alignment sensor depends on a position of the vehicle relative to a fixed location; and
operating at least one positioning system of the vehicle, under control of a vehicle alignment system that is operatively connected to receive the sensor data from the alignment sensor;
wherein the vehicle alignment system is configured to obtain an image of the fiducial surface, to compare the image of the fiducial surface to a pre-determined set of benchmark images of the same fiducial surface to determine if the image of the fiducial surface matches one of the benchmark images of the fiducial surface, and to operate the at least one positioning system based on a determination by the vehicle alignment system of whether the image of the fiducial surface matches, approaches, or diverges from a pre-determined target image that corresponds to a desired location and position of the vehicle relative to the fixed location; and
wherein the vehicle alignment system is configured to obtain images of the fiducial surface at an unknown distance or orientation from the fiducial surface, and if one of the images of the fiducial surfaces matches one of the benchmark images of the fiducial surface, to store known distance or orientation information associated with the benchmark image in memory based on the match.

* * * * *